Oct. 11, 1938.                I. SCHIGYO                    2,133,152
                  WELDING WITH SUPERIMPOSED HIGH FREQUENCY
                           Filed May 2, 1935
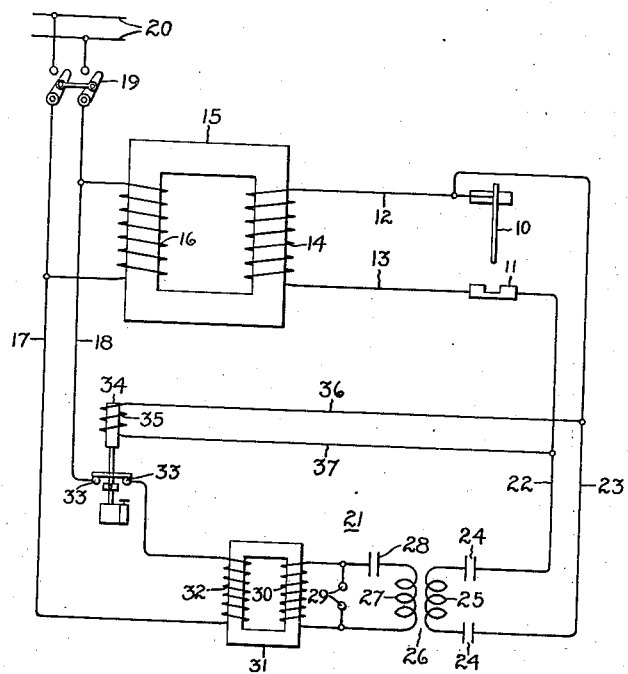
Inventor:
Iwane Schigyo,
by Harry E. Dunham
His Attorney.

Patented Oct. 11, 1938

2,133,152

UNITED STATES PATENT OFFICE 2,133,152

WELDING WITH SUPERIMPOSED HIGH FREQUENCY

Iwane Schigyo, Tokyo, Japan, assignor to General Electric Company, a corporation of New York Application May 2, 1935, Serial No. 19,479
In Japan June 8, 1934

4 Claims. (Cl. 219—8)

My invention relates to welding with superimposed high frequency.

In the various forms of electric welding it has been proposed to superimpose upon the welding electrodes a high frequency alternating current. In resistance welding this high frequency current is of sufficient voltage to establish and stabilize the flow of welding current through the work inserted between the welding electrodes as soon as the electrodes engage the work irrespective of the surface condition of the work at the point of welding. In arc welding the voltage of this superimposed high frequency is generally sufficient to strike the welding arc although its principal function is to stabilize the welding arc and thus in the case of alternating current arc welding render the operation more easy to perform especially where low current values are employed.

If the high frequency generator employed in such welding systems is maintained in continuous operation the wear on the generator is greater than necessary for usual welding operations which are for the most part intermittently performed. Thus for example in arc welding if the generator were maintained in operation after the welding operation had been interrupted for the adjustment of work or for some other purpose, unnecessary wear of the generator is occasioned. Particularly is this so in the case of generators of the gap discharge type where operation of the generator imposes considerable wear on the gap electrodes.

It is an object of my invention to provide welding apparatus embodying a high frequency generator, with means for energizing the generator only while the welding operation is in progress and to deenergize the generator a predetermined time after the welding operation has been completed. The predetermined time may be made adjustable if so desired.

The accompanying drawing diagrammatically illustrates arc welding apparatus embodying my invention.

In the drawing the welding electrodes are illustrated at 10 and 11. The electrode 10 may be a fusible electrode or an electrode of the non-consuming type, and the electrode 11 may be the work upon which the welding operation is being performed. These electrodes are connected to a supply of relatively large low voltage low frequency welding current through a welding circuit 12, 13. In the particular arrangements illustrated this source is the secondary 14 of a welding transformer 15. The primary 16 of this transformer is connected through conductors 17 and 18 and a switch 19 to a source of supply 20.

A high frequency generator 21 is connected to supply a relatively small high voltage high frequency current to the welding circuit 12, 13 through conductors 22, 23. Conductors 22, 23 are connected through low frequency stopping condensers 24 to the secondary 25 of a high frequency transformer 26 whose primary 27 forms part of a circuit adapted to oscillate at high frequencies. The condenser 28 and spark gap 29 connected to the primary 27 of the high frequency transformer 26 complete the oscillating circuit. This circuit is energized by being connected to the secondary 30 of transformer 31 whose primary 32 is connected through conductors 17 and 18 and control contacts 33 of a time element relay 34 to the source of supply 20. The operating coil 35 of the relay 34 is connected through conductors 36 and 37 and conductors 22 and 23 to the welding circuit 12, 13. Its operating coil is thus responsive to the voltage across the electrodes 10 and 11. The relay 34 is of the time delay type and operates after a predetermined length of time in response to voltages across the electrodes 10 and 11 which are greater than the arcing voltages employed during welding.

The system above described operates as follows: When the switch 19 is open, the various circuits above described are deenergized and relay 34 assumes the position illustrated in the drawing. When switch 19 is closed, transformers 15 and 31 are energized by being connected to the source of supply 20 through conductors 17 and 18. If the welding electrodes 10 and 11 are not brought into engagement with one another to strike a welding arc or if a welding arc is not established between these electrodes the relay 34 is sufficiently energized to open its contacts 33 after a predetermined time interval and thus disconnect the transformer 31 from the source of supply 20. This will deenergize the high frequency generator 21 and until a welding operation is initiated this generator will remain deenergized.

If the welding operator brings the electrode 10 into engagement with the work 11 to strike and thereafter maintains a welding arc, the voltage applied to the operating coil 35 of the relay 34 will be insufficient to operate the relay and during welding the high frequency generator 21 will consequently remain connected through conductors 17 and 18 to the source of supply 20. If during welding the welding circuit is opened by the arc being momentarily interrupted or interrupted for a predetermined short length of time, the relay 34 will not be sufficiently energized for a long enough period of time to open its contacts 33 and the high frequency generator will be continuously energized and thus furnish high frequency current to the welding circuit 12, 13 to assist in striking the arc and to stabilize its operation after it has once been ignited. The period of time during which the high frequency generator is energized after a welding operation has been interrupted or discontinued is determined by the time element relay 34. This time may be made adjustable in order to adapt the welding system to various types of work by using a relay 34 having a time adjustment.

Although a time element relay operating in response to the voltage of the welding circuit has been illustrated in the embodiment above described, it is to be understood that a current responsive relay connected in the welding circuit may be used for accomplishing the same desired control. In fact, any time element relay connected to be responsive to a characteristic of the welding circuit may be employed for energizing and deenergizing the high frequency generator in accordance with my invention.

It is apparent that my invention is not limited in its application to high frequency generators of the type described above since other types of generators may be used. It is also apparent that my invention is not limited in its application to alternating current welding but may be applied equally well to direct current welding. Thus, while I have illustrated and described but one embodiment of my invention, it is to be understood that my invention is of general application to all types of welding employing superimposed high frequency current.

What I claim as new and desire to secure by Letters Patent of the United States is:

1. Arc welding apparatus comprising welding electrodes adapted to strike and maintain a welding arc, a circuit connected to said electrodes for supplying welding current thereto, a high frequency generator connected to said welding circuit for supplying a high frequency arc stabilizing current thereto, a time element relay having an operating coil and control contacts, means including said control contacts of said relay for including said high frequency generator, and deenergizing said high frequency generator, and means for connecting said operating coil of said relay with said welding circuit to control its energization to close said control contacts of said relay during a welding operation and to open said control contacts of said relay a predetermined time after a welding operation has been completed.

2. Arc welding apparatus comprising a plurality of welding electrodes adapted to strike and maintain a welding arc, means for supplying welding current to said electrodes, means for supplying a high voltage high frequency starting and stabilizing current to said electrodes, and means including a time element relay having an operating coil connected to be responsive to voltages across said electrodes for deenergizing said last-mentioned means after a predetermined length of time in response to voltages greater than arc welding voltages.

3. An arc welding apparatus comprising a pair of arc-forming electrodes, means for delivering low frequency current to such electrodes, means for delivering high frequency current to such electrodes, and a relay energized by the first-mentioned means and controlling the last-mentioned means, whereby interruption of the low frequency current entails interruption of the high frequency current.

4. An arc welding apparatus comprising a pair of arc-forming electrodes, means for delivering low frequency current to such electrodes, means for delivering high frequency current to such electrodes, and a relay energized by the first-mentioned means and controlling the last-mentioned means, whereby interruption of the low frequency current entails interruption of the high frequency current, the relay having a retarded action.

IWANE SCHIGYO.